United States Patent
Huchet et al.

(10) Patent No.: US 6,832,763 B2
(45) Date of Patent: Dec. 21, 2004

(54) PROTECTIVE BELLOWS

(75) Inventors: Sebastien Huchet, Nantes (FR); Jean Luc Bouhour, La Haye Foussiere (FR); Bernard Marhic, Basse Goulaine (FR)

(73) Assignee: Trelleborg AB, Trelleborg (SE)

( * ) Notice: Subject to any disclaimer, the term of this patent is extended or adjusted under 35 U.S.C. 154(b) by 0 days.

(21) Appl. No.: 09/925,754

(22) Filed: Aug. 9, 2001

(65) Prior Publication Data

US 2002/0043772 A1 Apr. 18, 2002

(30) Foreign Application Priority Data

Aug. 22, 2000  (GB) .............................................. 0020701

(51) Int. Cl.$^7$ .................................................. F16J 3/00
(52) U.S. Cl. ........................ 277/634; 377/636; 464/175
(58) Field of Search .................................. 277/634, 635, 277/636; 464/173, 175, 111; 285/145.5, 226, 227, 241, 245, 253; 403/50, 51

(56) References Cited

U.S. PATENT DOCUMENTS

| | | | | |
|---|---|---|---|---|
| 4,083,202 A | * | 4/1978 | Westercamp | 64/32 |
| 4,090,751 A | * | 5/1978 | Krude | 384/498 |
| 4,605,384 A | * | 8/1986 | Kurzeja et al. | 464/111 |
| 4,795,404 A | * | 1/1989 | Sutton et al. | 464/111 |
| 5,529,538 A | * | 6/1996 | Schulz et al. | 464/111 |
| 6,089,574 A | * | 7/2000 | Sadr et al. | 277/636 |

FOREIGN PATENT DOCUMENTS

| | | |
|---|---|---|
| EP | 0 924 450 A | 6/1999 |
| EP | 0 942 189 A | 9/1999 |
| GB | 2 330 883 A | 5/1999 |
| JP | 10 110738 A | 4/1998 |
| JP | 2002 013546 A | 1/2002 |

\* cited by examiner

*Primary Examiner*—Heather Shackelford
*Assistant Examiner*—Michael J. Kyle
(74) *Attorney, Agent, or Firm*—Leydig, Voit & Mayer, Ltd.

(57) ABSTRACT

A protective bellows formed by injection (blow) moulding has a large-diameter end with a fixing collar (28) for sealingly embracing an externally tri-lobed surface of a housing of an articulation joint for a motor vehicle transmission. The fixing collar (28) comprises a circumferential outer surface 29 and an inner surface (30). The inner surface (30) is made up of part-circumferentially curved surface portions (30A, 30B, 30C) for engaging the three lobes of the housing, and three equi-angularly spaced inwardly curved integral surface portions (32A, 32B, 32C) which are shaped to engage the spaces or grooves between the three lobes on the housing. The resilient material between the outer surface (29) and each inwardly curved surface portion (32A, 32B, 32C) is formed with several slots (34) arranged with their depths directed in a radial direction. The slots (34) aid the de-moulding process.

9 Claims, 2 Drawing Sheets

PROTECTIVE BELLOWS

BACKGROUND TO THE INVENTION

The invention relates to protective bellows. Protective bellows embodying the invention, and to be described below in more detail by way of example only, are for connection to and for protecting transmission joints in vehicles. However, they can be used for other purposes.

SUMMARY OF THE INVENTION

According to the invention, there is provided a protective bellows having an integral fixing collar for attaching the bellows to and around an outside peripheral non-circular surface of a housing, the fixing collar comprising resilient material defining a generally circumferential peripheral outer surface and at least one inwardly curved surface portion on the inside of the collar and matching and for engaging part of the outside surface of the housing, the resilient material between the outer surface and the inwardly curved surface portion being formed with at least one slot having a length extending in a circumferential direction and a depth extending in a radial direction.

Protective bellows embodying the invention will now be described, by way of example only, with reference to the accompanying diagrammatic drawings in which:

DESCRIPTION OF THE PREFERRED EMBODIMENTS

Figure 1:
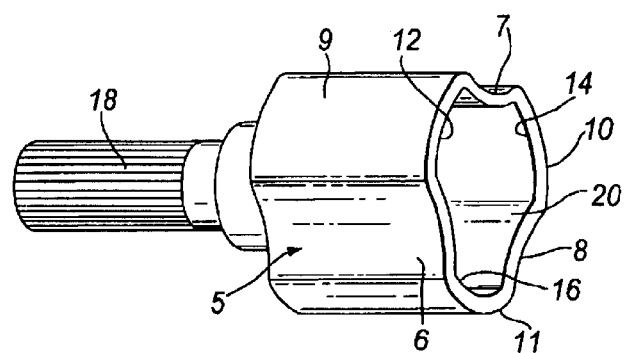
FIG. 1 is a perspective view of part of a transmission joint of a vehicle.

FIG. 1 shows part of an articulated joint for the transmission of a vehicle, (front or rear wheel drive transmission). The joint comprises a housing 5, preferably made of steel, of tri-lobed construction. Its external surface is provided with grooves 6, 7 and 8 between lobes 9, 10 and 11 with corresponding grooves 12, 14 and 16 on its internal surface. The lobes 9, 10 and 11 are formed by respective parts of the same cylindrical surface. The grooves 12, 14 and 16 locate the balls or rollers (not shown) of the joint which allow the necessary articulating movement between the two parts of the vehicle transmission which are to be interconnected by the joint. As shown, the housing 5 is connected to a splined shaft 18 forming one of the parts of the transmission. The other part (not shown) comprises a shaft which is, in use, drivingly connected to the balls or rollers of the joint via the opening 20 of the housing 5.

In order to protect the mechanism of the joint from contamination and dust and to retain the necessary lubricant within the housing 5, a flexible bellows is attached to the housing 5 so as to close the opening 20.

Figure 2:
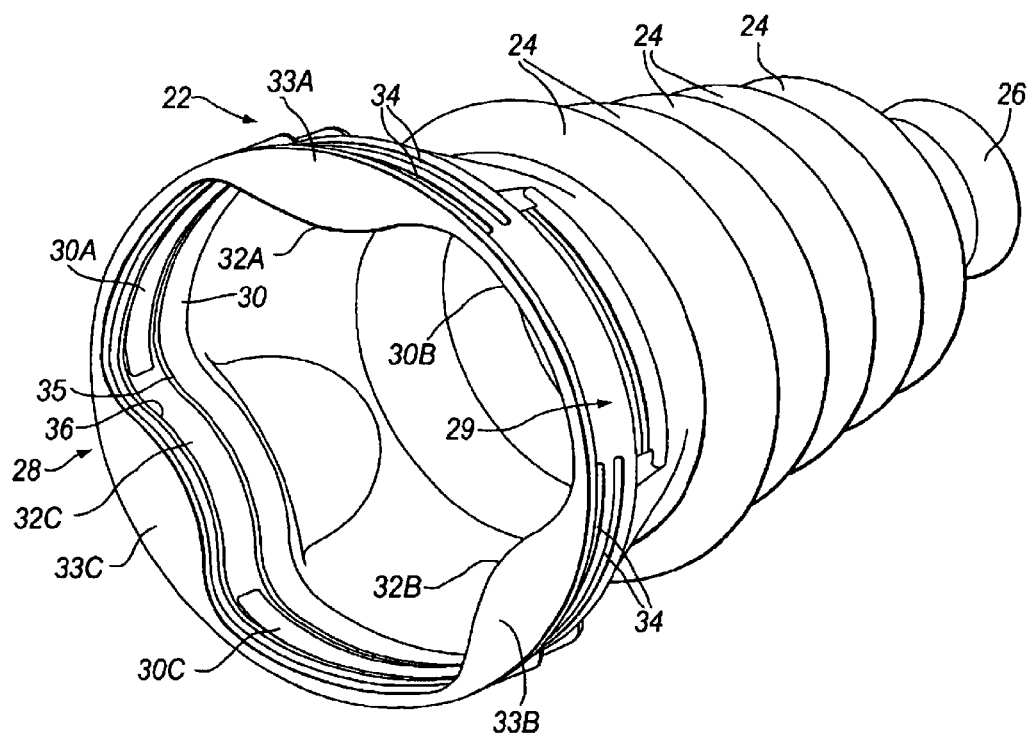
FIG. 2 is a perspective view of one of the protective bellows, for fitting onto the joint of FIG. 1.

One form of the protective bellows is shown at 22 in FIG. 2. Preferably it is produced from thermoplastics material by injection blow-moulding. It comprises bellows turns 24 integrally extending with successively increasing diameters from a small diameter fixing collar 26 to a large diameter fixing collar 28. In use, the fixing collar 26 elastically and sealingly grips around the drive shaft (not shown) of the transmission which is connected to the balls or rollers within the housing 5 (FIG. 1), and the large diameter collar 28 similarly grips the housing 5 in the manner to be explained.

The fixing collar 28 has an external circumferential surface 29 and an internal surface 30. The internal surface is matched to shape the external surface of the housing 5. Thus, it comprises part-circumferential surface portions 30A, 30B and 30C which match the shape of the corresponding portions of the external surface 29. The portions 30A, 30B and 30C are integrally connected by inwardly curved surface portions 32A, 32B and 32C. The surface portions 30A, 30B and 30C are sized and shaped and mutually spaced to match the sizes, shapes and positions of the lobes 9, 10 and 11 of FIG. 1. Similarly, the inwardly curved surface portions 32A, 32B and 32C form bulbous portions which are sized, shaped and mutually spaced so as to match the surfaces of the groves 6, 7 and 8 of the housing 5.

In use, the bellows 22, with its small diameter collar 26 fitted over the drive shaft (not shown), is fitted onto the housing 5 (FIG. 1) so that the large diameter collar 28 externally and sealingly grips the external surface of the housing 5, with the part circumferential surface portions 30A, 30B and 30C engaging the lobes 9, 10 and 11 and with the inwardly curved surface portions 32A, 32B and 32C engaging the grooves 6, 7 and 8.

The fitting process may be completed by means of an encircling band 40, which is tightened around the external surface 29 of the collar 28.

Figure 3:
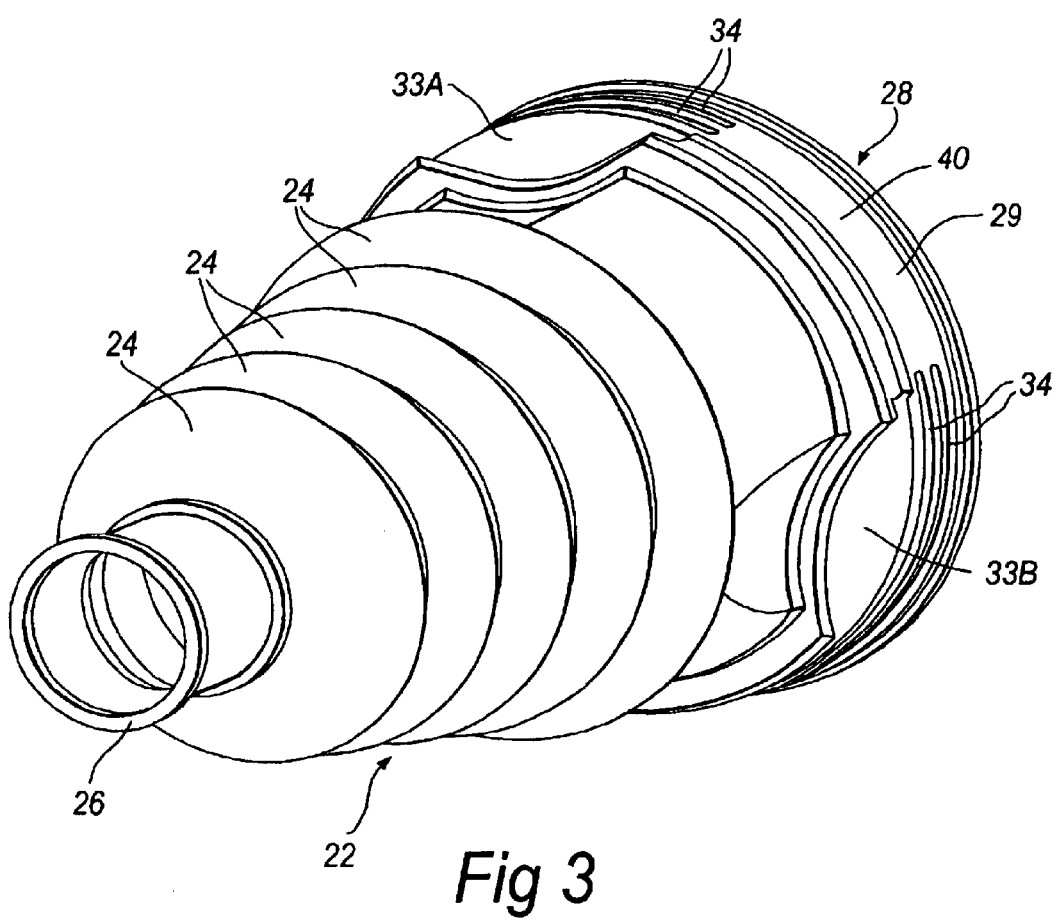
FIG. 3 is a perspective view corresponding to FIG. 2 but viewed in the opposite direction.

As shown in FIGS. 2 and 3, the inwardly curved surface portions 32A, 32B and 32C are carried by bulbous, lobe-shaped portions of the moulded resilient material 33A, 33B and 33C. However, the portions 33A, 33B and 33C are not solid but formed with slots. In the bellows illustrated in FIG. 2, there are two such slots 34 for each portion 33A, 33B and 33C but there may be more or fewer than two such slots. Each slot 34 extends inwardly from the outer periphery of the collar 28 substantially through all the material of the bulbous portions 33A, 33B, 33C. In this way, the lobe portions 33A, 33B, 33C are not solid but are nevertheless sufficiently strong to ensure that the bellows is properly located on the housing 5.

The inner surface 30 of the fixing collar 28 is formed with ridges 35, 36 to increase its grip on the housing 5.

The form of the collar 28 is relatively simply to realise using injection blow-moulding techniques. The arrangement of the bulbous portions 33A, 33B, 33C with their slots 34 is advantageous as compared with arrangements which use solidly moulded similarly-shaped portions instead. The latter arrangements are relatively massive and are difficult to produce by moulding: difficulties of removal from the mould occur. Such arrangements cause there to be a significant variation in the gripping force applied around the circumference of the fixing collar.

The bellows illustrated is also advantageous as compared with arrangements in which the bulbous portions 33A, 33B and 33C are formed by thin inwardly curved walls supported from the outer peripheral wall of the fixing collar 28 by ribs directed generally radially such as shown in our co-pending United Kingdom Specification No. 2,330,883. In the latter arrangement, axially directed moulded core portions must be provided for forming the ribs during the moulding operation. When these are withdrawn in an axial direction with the main mould core, damage to the inner peripheral ridges 35, 36 may occur because the core prevents the material of the collar 28 flexing in a radial direction. With the bellows shown in FIGS. 2 and 3 herein, no such radially directed ribs are used and this problem does not occur. The slots 34 are produced by mould core parts which are withdrawn in a radially outward direction.

The arrangement shown in FIGS. 2 and 3 herein is also advantageous over the prior arrangement because, in the prior arrangement, the ribs concentrate the radially inward forces produced on the inwardly curved surface portions 32A, 32B and 32C by the clamp which, in use, extends around the outside of the collar 28. This may cause damage or distortion to the material of the collar 28.

The arrangements described and illustrated are advantageous in that they enable the bellows to be easily and simply fitted onto a tri-lobed housing such as shown in FIG. 1. It is therefore not necessary for the housing to be formed so as to be tri-lobed on its inner surface but smoothly cylindrical on its outer surface; such an arrangement is relatively difficult to manufacture and produces a relatively heavy housing.

We claim:

1. A protective bellows comprising an integral fixing collar for attaching the bellows to and around an outside peripheral non-circular surface of a housing, the fixing collar comprising resilient material defining a generally circumferential peripheral outer surface disposed about an axis of the bellows, and an inner surface, the inner surface defining at least one inwardly curved surface portion adapted to match and engage part of the outside surface of the housing, the outer surface and the inner surface being interconnected by an end wall lying in a plane substantially normal to said axis, the resilient material between the outer surface and the inwardly curved surface portion being formed with at least two slots having a length extending in a circumferential direction and a depth extending in a radial direction, the slots being separated by a rib, and each said slot opening only into the circumferential peripheral outer surface, and said resilient material between the outer surface and the inwardly curved surface portion comprising no slot opening into said plane of said end wall.

2. The bellows according to claim 1, wherein the inner surfaces comprises a plurality of inwardly curved surface portions for respectively matching and engaging different parts of the outside surface of the housing, the resilient material between the outer surface and each inwardly curved surface portion being formed with at least one respective said slot, the inwardly curved surface portions alternating around the periphery of the fixing collar with respective part circumferential surface portions of the peripheral outer surface.

3. The bellows according to claim 2, in which each part circumferential surface portion of the peripheral outer surface of the fixing collar matches and is for engaging the inside peripheral surface of the housing where said outside peripheral surface of the housing is not engaged by each inwardly curved surface portion.

4. The bellows according to claim 2, in which the inwardly curved surface portions define three equi-angularly spaced inwardly projecting bulbous portions, the peripheral inside surface of the fixing collar between each pair of adjacent such bulbous portions constituting a respective part circumferential surface portion for engaging the outside peripheral surface of the housing where said outside peripheral surface of the housing is not engaged by each such bulbous portion, whereby the fixing collar is for attaching the bellows to the outside peripheral surface of a tri-lobed housing of a transmission joint in a motor vehicle.

5. The bellows according to claim 1, in which the resilient material between the peripheral outer surface and the at least one inwardly curved surface portion is formed with a plurality of the said slots which are side by side and spaced apart from each other in a direction axially of the bellows.

6. The bellows according to claim 1, molded from thermoplastics material.

7. The bellows according to claim 1 wherein said at least two slots are disposed substantially parallel.

8. A protective bellows that is readily demolded during a fabrication process wherein the protective bellows is molded in a mold, said protective bellows comprising an integral fixing collar for attaching the bellows to and around an outside peripheral non-circular surface of a housing, the fixing collar comprising resilient material defining a generally circumferential peripheral outer surface disposed about an axis of the bellows, and an inner surface comprising at least one inwardly curved surface portion adapted to match and engage part of the outside surface of the housing, the outer surface and the inner surface being interconnected by an end wall lying in a plane substantially normal to said axis, the resilient material between the outer surface and the inwardly curved surface portion being formed with at least one slot having a length extending in a circumferential direction and a depth extending in a radial direction, and each said slot opening only into the circumferential peripheral outer surface, and said resilient material between the outer surface and the inwardly curved surface portion comprising no slot opening into said plane of said end wall, whereby the protective bellows is readily demolded from the mold during the fabrication process.

9. The protective bellows as claimed in claim 8 wherein the fixing collar comprises substantially thin walls defined by the at least one slot.

* * * * *